United States Patent [19]

Machacek et al.

[11] 4,302,862
[45] Dec. 1, 1981

[54] SNOW REMOVAL TOOL

[75] Inventors: Robert W. Machacek, Lombard; Charles E. Nichols, Woodridge; John R. Howard, West Chicago, all of Ill.

[73] Assignee: The Drackett Company, Cincinnati, Ohio

[21] Appl. No.: 106,647

[22] Filed: Dec. 26, 1979

[51] Int. Cl.³ .............................................. B60S 3/04
[52] U.S. Cl. .................................................... 15/117
[58] Field of Search ................. 15/105, 111, 114, 117, 15/143 B, 144 R, 145, 160, 172, 176, 236 R, 245

[56] References Cited

U.S. PATENT DOCUMENTS

| | | | |
|---|---|---|---|
| 622,621 | 4/1899 | Ham | 15/145 |
| 729,338 | 5/1903 | Hawkins | 15/117 X |
| 1,255,902 | 2/1918 | Marriott | 15/117 X |
| 3,036,322 | 5/1962 | Jorgensen | 15/111 |
| 3,051,975 | 9/1962 | Schwartz | 15/117 X |

FOREIGN PATENT DOCUMENTS

| | | | |
|---|---|---|---|
| 3278 | of 1886 | United Kingdom | 15/145 |
| 202424 | 8/1923 | United Kingdom | 15/144 R |
| 216355 | 5/1924 | United Kingdom | 15/176 |

*Primary Examiner*—Edward L. Roberts
*Attorney, Agent, or Firm*—Sharon A. Blinkoff; George A. Mentis

[57] ABSTRACT

A snow removal tool having a brush and a handle. The tool can be assembled in a T-shaped mode by locking an end of the handle to the center of the brush. When the brush is not used in the T-shaped mode, the handle is pushed into the hollow tube of the brush and twist locked in a short longitudinal mode. The handle can also be locked in one end of the tube of the brush thereby permitting the handle to act as an extension of the brush when a longer reach is desired.

10 Claims, 15 Drawing Figures

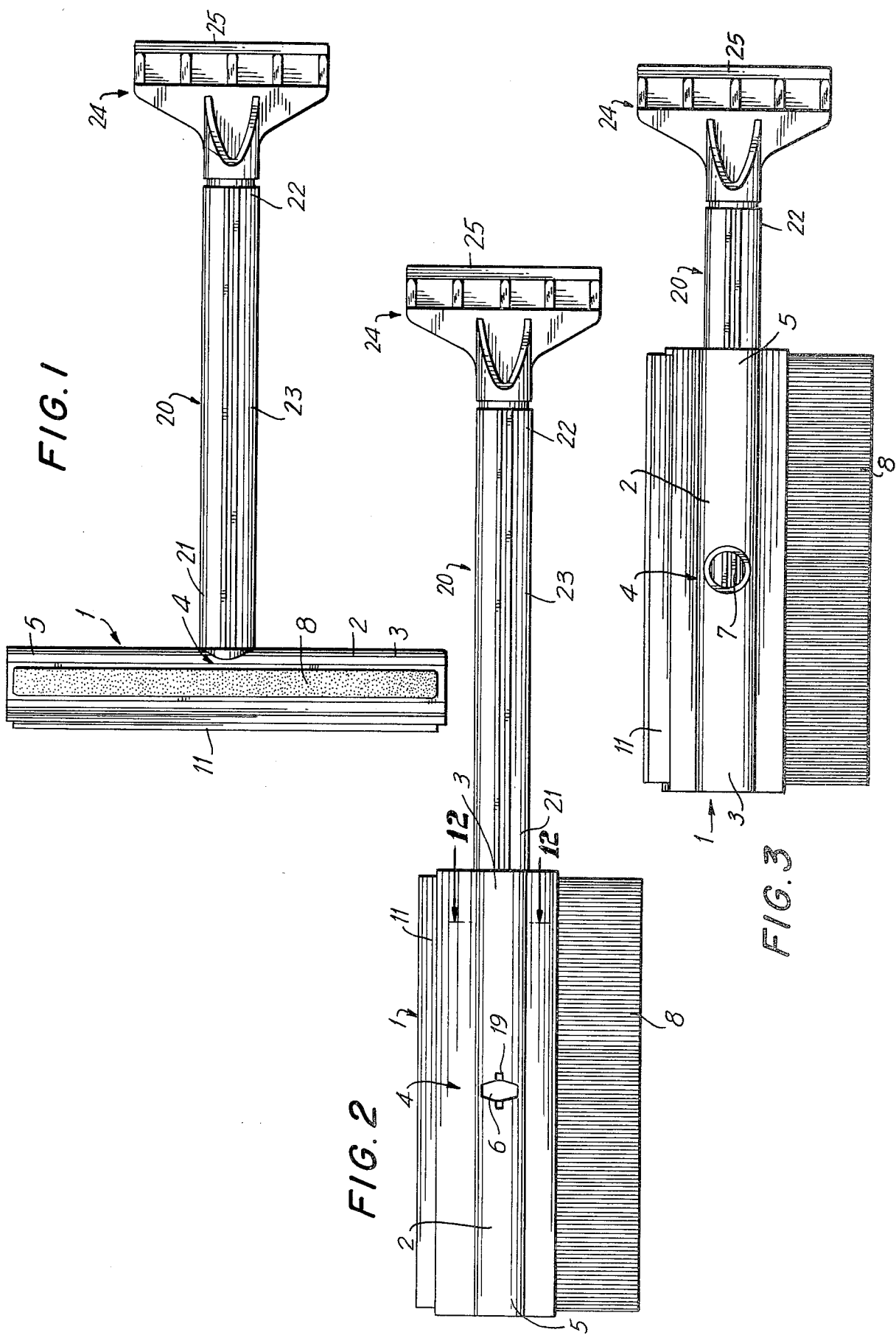

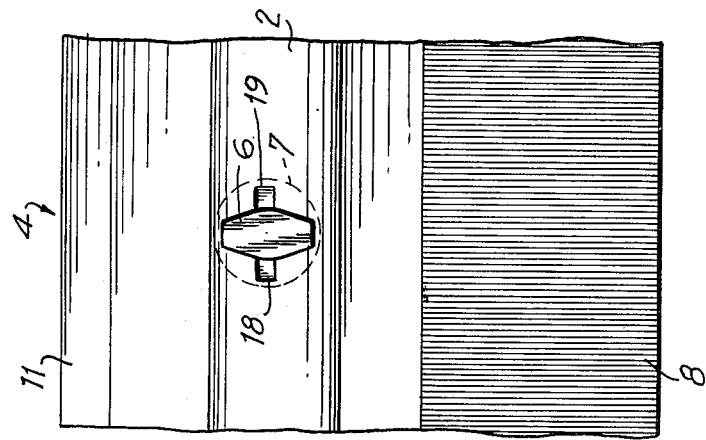
FIG. 8
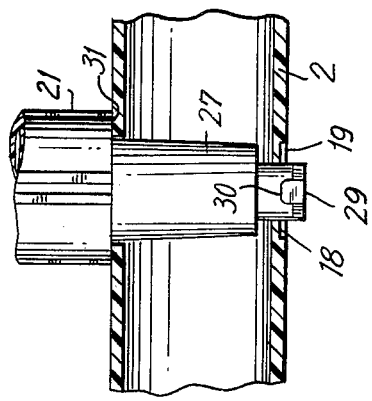
FIG. 9
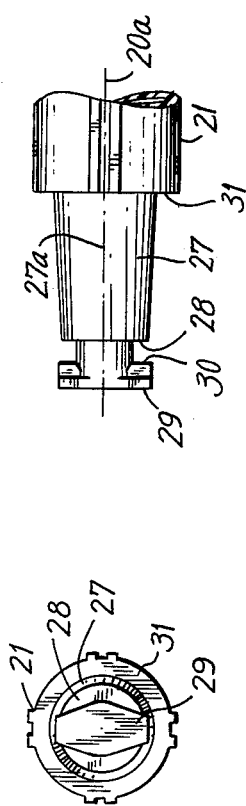
FIG. 6
FIG. 4
FIG. 5
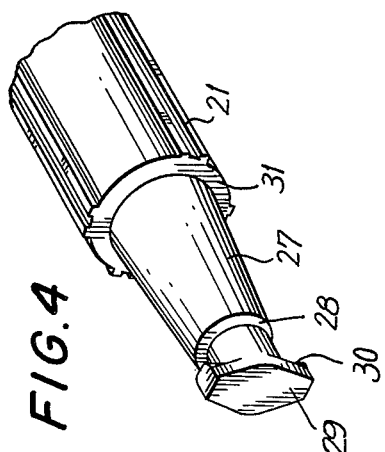
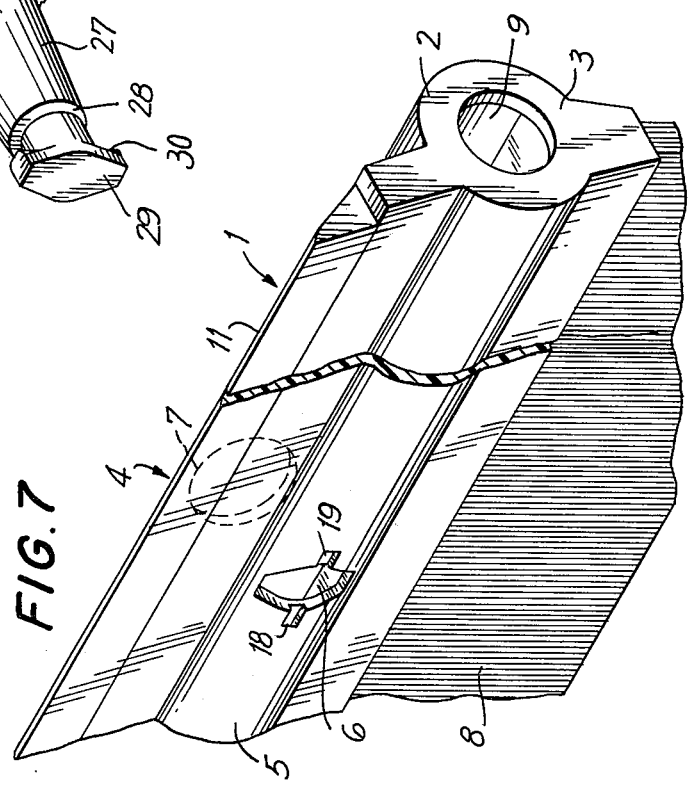
FIG. 7

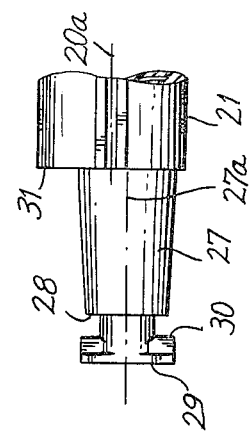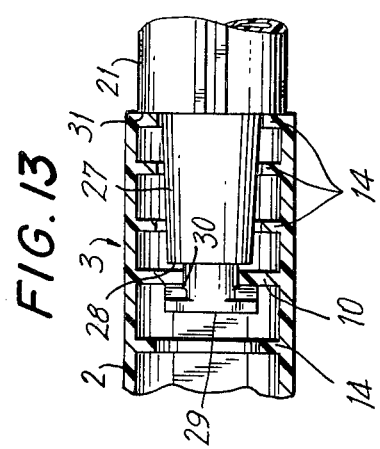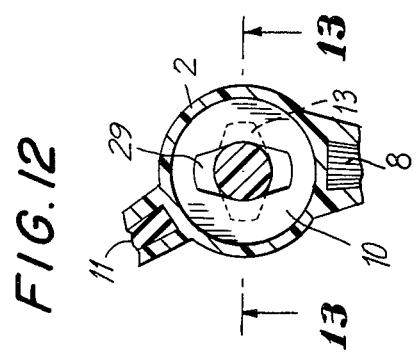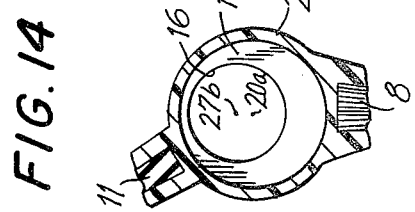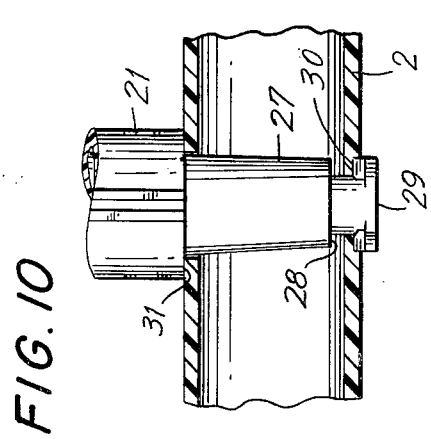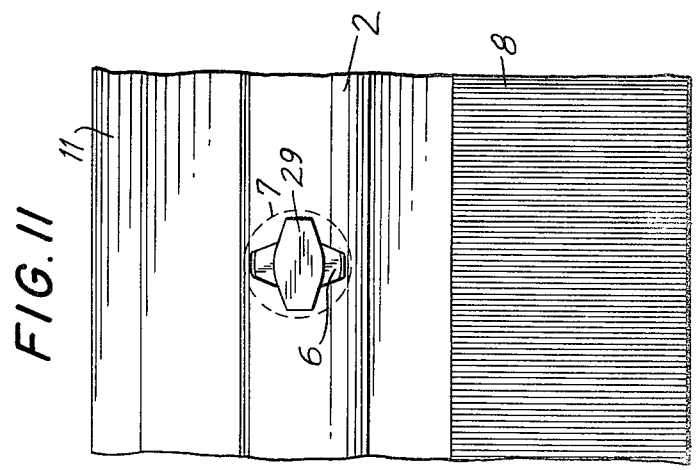

SNOW REMOVAL TOOL

BACKGROUND OF THE INVENTION

1. Field of the Invention

The invention relates to a snow removal tool having a brush and handle parts which may be assembled in a T-shaped mode, a short longitudinal mode and a long longitudinal mode.

2. Description of the Prior Art

In the past, it has been common to mount a scraper on the end of the handle of a brush to form a tool which may be used for brushing snow or for scraping snow and ice. It is generally known that a handle may selectively engage a brush as taught by Wilkinson in U.S. Pat. No. 607,105. However, the prior art is generally deficient in that it has failed to provide a snow removal tool which can efficiently operate in a brushing mode or a plurality of brushing modes and can also be conveniently operated in a scraping mode.

SUMMARY OF THE INVENTION

It is an object of this invention to describe a compact, multi-purpose snow tool which is designed primarily for snow and ice removal from automobiles.

It is another object of this invention to describe a snow removal tool which is versatile so that it can be used as a scraper, squeegee or brush, compact so that it may be assembled and disassembled with ease and well constructed so that it may be used to remove significant amounts of snow and ice.

It is a further object of this invention to describe a snow removal tool which may be assembled into three separate modes: A T-shaped mode, a short longitudinal mode and a long longitudinal mode.

It is yet another object of this invention to describe a snow removal tool wherein a handle part selectively frictionally engages a brush part providing a positive interconnection which may be assembled or disassembled by a consumer. It is yet another object of this invention to provide for two locking positions for each positive interconnection of the tool. These positions are 180° from each other and provide for convenient use by either a right or left handed consumer.

The snow removal tool according to this invention has both handle and brush parts. The brush part is comprised of a tubular member having an axial bore therethrough where said tubular member carries bristles on one side and a squeegee blade on an opposite side thereof. Additionally said tubular member has a female locking hole located in a central portion of a side of said tubular member which is in registry with a circular hole formed in the opposite side of said tubular member. Said tubular member also has a locking means which is disposed in one end of the axial bore. The handle part has two end portions and a central portion. One end portion has engaging means to engage the brush part and the other end portion carries a scraper with a scraping blade. The engaging means of the handle is comprised of a frustum having a male locking button attached to one end of the frustum.

Three types of engagement between the brush and handle parts can be selectively employed. In order to form the snow removal tool in a T-shaped mode the frustum of the handle is inserted into the circular hole of the tubular member of said brush part until the male locking button of the handle is inserted into the female locking hole of said tubular member. The handle and brush parts are then rotated so that there is a frictional engagement between the male and female locking parts of the handle and brush parts.

In addition to the T-shaped mode there are two longitudinal modes which can be employed, a long longitudinal mode and a short longitudinal mode. To assemble the snow removal tool in the long longitudinal mode the engaging means of the handle is inserted into the end of the axial bore of the brush part which carries the locking means. The handle and the brush parts are then rotated so that there is a frictional engagement between the locking means of the brush part and the engaging means of the handle part. To form the tool in the short longitudinal mode the handle is inserted into the end of the axial bore opposite the end carrying the locking means. The handle is then inserted into the bore until the engaging means on the handle contacts the locking means in the axial bore. The handle and brush parts are then rotated until there is a frictional engagement between the locking means of the brush part and the engaging means of the handle part.

BRIEF DESCRIPTION OF THE DRAWINGS

These features and objects of the invention as well as others will become apparent to those skilled in the art by referring to the accompanying drawings in which:

FIG. 1 is a bottom view of the snow removal tool according to the invention assembled in the T-shaped mode;

FIG. 2 is a side view of the snow removal tool according to the invention assembled in the long longitudinal mode;

FIG. 3 is a side view of the snow removal tool according to the invention assembled in the short longitudinal mode;

FIG. 4 is a perspective view of the first end of the handle part according to the invention;

FIG. 5 is an end view of the first end of the handle part shown in FIG. 4;

FIG. 6 is a side view of the first end portion of the handle part shown in FIGS. 4 and 5;

FIG. 7 is a perspective view of the brush part of the invention;

FIG. 8 is a front view of the openings in the tubular member of the brush part;

FIG. 9 is a partial cross sectional view of the first end of the handle part inserted into the tubular member of the brush part in the T-shaped mode;

FIG. 10 is a view similar to FIG. 9 showing the handle part rotated into locking position with respect to the brush part;

FIG. 11 is a front view of the handle and brush parts as shown in FIG. 10;

FIG. 12 is a sectional view taken along lines 12—12 of FIG. 2 showing the preferred locking means which is comprised of a constriction having a female locking hole in locking engagement with the male locking button of the handle;

FIG. 13 is a sectional view taken along lines 13—13 of FIG. 12;

FIG. 14 is a sectional view showing an alternate locking means which is comprised of a constriction having a circular opening which is eccentric to the axis of the brush part; and FIG. 15 is a sectional view showing an alternate embodiment of one end of the handle which is adapted to engage the alternate locking means shown in FIG. 14.

DETAILED DESCRIPTION OF THE PREFERRED EMBODIMENT

The snow removal tool according to the invention is comprised of a brush part 1 and a handle part 20. The tool according to the invention is constructed such that the handle may transversely engage the brush to form a T-shaped mode as shown in FIG. 1. The T-shaped mode allows the tool to be used in a variety of ways. For example, the handle may be grasped so that the brush can be used in a pushing or pulling type motion. Alternatively, the handle may be grasped so that the scraper 24 mounted at the end of the handle part 20 may be employed. Also, the brush part 1 may be grasped with two hands so that a significant force may be applied to the scraper 24.

The invention also allows the engagement of the handle and brush parts in a long longitudinal mode as shown in FIG. 2. This mode allows the handle part 20 to be grasped so that the brush or squeegee will extend out a significant distance and can be used in a side to side manner such as is necessary to brush snow from the top of an automobile or to remove water from a windshield. The brush part may also be grasped so that the scraper can be employed. The invention also allows the assembly of the brush and handle parts in a short longitudinal mode as shown in FIG. 3. In both longitudinal modes, the brush and handle parts are coaxial. However, in the short longitudinal mode a major portion of the handle part is located within an axial bore in the brush part. The short longitudinal mode allows the tool to be used as a brush or scraper. The short longitudinal mode is also the most convenient mode for storing the tool according to the invention. The features of the invention can be particularly appreciated by referring to the details illustrated in FIGS. 4–15.

The brush part 1 is generally comprised of a tubular member 2 having a first end 3, a center portion 4, and a second end 5. The center portion 4 of the brush 1 is provided with a small female locking hole 6 on one side thereof and a large circular hole 7 on the opposite side thereof. Holes 6 and 7 are in registry as can be appreciated by referring to FIG. 8.

The brush is provided with a plurality of bristles 8 which radially project from the tubular member 2. The bristles 8 may be attached to the tubular member 2 by any conventional means such as gluing, heat fusing or the mechanical engagement of the bristles 8 and the tubular member 2. It is also contemplated that a longitudinal groove may be formed in the tubular member 2 and the bristles may be inserted or compressed into the groove. Additionally, the brush may be provided with a squeegee blade 11. This may be attached to tubular member 2 by any conventional means such as gluing. It is also contemplated that a second longitudinal groove may be formed in the tubular member and that the squeegee blade may be inserted or compressed into this second groove. The tubular member 2 has an axial bore 9 therethrough and the first end 3 of the tubular member 2 is provided with a locking means which as shown in FIGS. 12 and 13 consists of a constriction 10 having a female locking hole 13.

The handle part 20 of the snow removal tool according to the invention has a first end 21 forming an engaging means for engaging the brush part 1. The handle part also has second end 22 opposite the first end and a center portion 23 interconnecting the first end 21 with the second end 22. The second end 22 of the handle part 20 is connected to a scraper means 24 which may be provided with a scraping blade 25.

The first end 21 of the handle part 20 tapers into a frustum 27 with a shoulder 31 formed between the first end 21 and the frustum 27. Generally, the handle part 20 including first end 21, second end 22 and center portion 23 is a tubular or cylindrical member. In the preferred embodiment the handle part has a central axis 20a which is coaxial with axis 27a of the frustum illustrated in FIG. 6.

The frustum 27 tapers to a male locking button 29 with an annular groove 28 located between the frustum 27 and the male locking button 29. The front surface of the male locking button 29 is flat and the rear surface forms a bearing surface 30.

As particularly shown in FIG. 13, the first end 3 of the tubular member 2 has an axial bore 9 therein. Within the axial bore 9 is located a locking means which is comprised of a constriction 10 having a female locking hole 13. It is contemplated that the first end of the axial bore 9 may be provided with a plurality of annular ribs for restraining lateral motion of the frustum within the axial bore 9 when the handle and brush parts are assembled in the long longitudinal mode. In an alternate embodiment of the present invention as shown in FIGS. 14 and 15, the locking means which is shown in FIG. 14 is comprised of a constriction 15 having a circular hole 16 that is eccentric with respect to the axis of the tubular member 2. This locking means is disposed within the first portion 3 of axial bore 9. In order to frictionally engage the circular hole 16 the axis of the frustum 27b as shown in FIG. 15 must be offset from the axis 20a of the handle.

To assemble the tool of the invention in the T-shaped mode, the following procedure is employed. The first end 21 of the handle 20 is inserted through the large circular hole 7 so that the male locking button 29 projects through the female locking hole 6. This procedure can best be appreciated by referring to FIG. 9. Note that the shoulder 31 abuts the outer surface of the tubular member 2. The length of the frustum 27 is equal to the outside diameter of the tubular member 2 so that the male locking button 29 projects outside of the tubular member 2. This positioning of the first end 21 of the handle part with respect to the tubular member 2 also results in the annular groove 28 between the frustum 27 and the male locking button 29 to be positioned in alignmemnt with the wall of the tubular member 2 which forms the female locking hole 6. The handle part 20 is then rotated approximately 90° in either direction in order to achieve locking engagement of the handle part 20 and the brush part 1. This aspect of the invention is particularly shown in FIG. 10. By rotating the handle part 20 the bearing surface 30 of the male locking button 29 frictionally engaging the outer surface of the tubular member 2 which also causes a frictional engagement between the outer surface of the tubular member 2 and the shoulder 31 of the first end 21 of the handle part 20. In the preferred embodiment of this invention, two grooves 18 and 19 are formed on either side of the female locking hole 6 to engage bearing surface 30.

In order to assemble the tool of the invention in the long longitudinal mode the following procedure is employed. The handle part 20 is coaxially aligned with the tubular member 2 of brush part 1. The frustum 27 is then inserted into the axial bore 9 of the first end 3 of tubular member 2 such that the male locking button 29 is inserted into the female locking hole 13 of constriction 10.

Once this occurs the handle is rotated 90° in either direction to lock the handle part 20 to the brush part 1. This aspect of the invention is shown in FIG. 12. By rotating the handle 20 the bearing surface 30 of the male locking button 29 frictionally engages an outer surface of the constriction 10. Additionally to retard lateral motion of handle 20 a plurality of annular ribs 14 may be formed in the first end 3 of tubular member 2 to engage the frustum 27 of the handle 20.

To assemble the tool in the short longitudinal mode, the first end 21 of the handle part 20 is inserted into the axial bore 9 of the second end 5 of the tubular member 2 until the male locking button 29 of the handle part 20 passes through the female locking hole 13 of constriction 10. The handle part 20 is then rotated 90° in either direction so that the bearing surface 30 of the male locking button 29 frictionally engages a surface of the constriction 10 as shown in FIG. 12.

Although not shown in the accompanying drawings two locking grooves similar to locking grooves 18 and 19 may be formed on each side of the constriction 10 disposed on either side of female locking hole 13 in the same location as locking grooves 18 and 19 are disposed with reference to female locking hole 6.

In order to unlock the handle and brush parts when assembled in the T-shaped mode the handle is rotated 90° in either direction to realign the male locking button 29 with the female locking hole 6, so that the handle part and the brush part can be separated. To unlock the handle and brush in the longitudinal modes, the handle is rotated 90° such that the male locking button 29 can pass through female locking hole 13 thereby allowing the brush part to be separated from handle part.

Various changes may be made in the details of the invention as described herein without departing from the basic invention or the scope of the appended claims. Furthermore, although this invention has been particularly described with respect to its aspects in relation to a snow removing tool, it is contemplated that the invention may have several industrial applications wherein the interengagement between a tubular member and a handle are necessary.

We claim:

1. A snow removal tool having multiple modes of assembly, comprising:
    a. a brush having a first end and a second end with a center portion therebetween;
    b. a handle having a first end and a second end interconnected by a center portion, an engaging means at the first end of the handle for selectively, (i) transversely engaging the center portion of the brush, resulting in the tool being assembled in a T-shaped mode or, (ii) coaxially engaging the first end of the brush, resulting in the tool being assembled in a longitudinal mode;
    wherein said engaging means is comprised of a male locking member transversely connected to the first end of the handle; and
    wherein the center portion of the brush has a female opening corresponding to the male locking member whereby insertion of the male locking member into the female opening and rotation of the handle with respect to the brush results in the snow removal tool being locked in the T-shaped mode.

2. The snow removal tool of claim 1 wherein said male locking member is an elliptical button having a bearing surface and wherein said female opening is an elliptical opening corresponding in size to the elliptical button whereby rotation of the handle with respect to the brush results in the bearing surface frictionally engaging the center portion of the brush.

3. The snow removal tool of claim 2 wherein the first end of the brush has an axial bore therein having a locking means for receiving the engaging means of the handle whereby insertion of the engaging means into the first end of the axial bore and rotating the handle with respect to the brush results in a frictional engagement between the first end of the handle and the first end of the brush resulting in the tool being locked in a long longitudinal mode.

4. The snow removal tool of claim 3 wherein said brush is provided with a coaxial bore extending from the first end to the second end and through the center portion, said bore for selectively receiving the first end and center of said handle, whereby insertion of the first end and the center portion of the handle part into said bore followed by engagement of said engaging means with the said locking means results in the snow removal tool being assembled in a short longitudinal mode.

5. The tool of claim 4 wherein said locking means is a constriction having an elliptical female opening corresponding in size to the elliptical button.

6. The snow removal tool of claim 4 wherein said locking means is a contriction having a circular opening which is eccentric with respect to the axis of the brush part.

7. The snow removal tool of claim 6 wherein the engaging means comprises an eccentric frustum located between the elliptical button and the first end portion of the handle part for frictionally engaging the circular opening of the constriction.

8. The snow removal tool of claim 5 wherein a frustum is located between the elliptical button and the first end portion of the handle part, and wherein the first end of said axial bore has a plurality of annular ribs.

9. The snow removal tool of claims 1, 2, 3, 4 or 8 wherein a scraping means is connected to the second end of said handle.

10. The snow removal tool of claim 9 wherein a squeegee blade is connected from the first end portion to the second end portion of the brush means.

* * * * *